(12) United States Patent
Shin et al.

(10) Patent No.: US 10,535,871 B2
(45) Date of Patent: Jan. 14, 2020

(54) COMPOSITE ELECTRODE ACTIVE MATERIAL, LITHIUM BATTERY INCLUDING THE SAME, AND PREPARATION METHOD THEREOF

(71) Applicant: SAMSUNG SDI CO., LTD., Yongin-si, Gyeonggi-do (KR)

(72) Inventors: Changsu Shin, Yongin-si (KR); Sora Lee, Yongin-si (KR); Changui Jeong, Yongin-si (KR); Hyeri Eom, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 469 days.

(21) Appl. No.: 15/227,869

(22) Filed: Aug. 3, 2016

(65) Prior Publication Data

US 2017/0104210 A1 Apr. 13, 2017

(30) Foreign Application Priority Data

Oct. 12, 2015 (KR) ........................ 10-2015-0142164

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0402* (2013.01); *H01M 4/043* (2013.01); *H01M 4/0471* (2013.01); *H01M 4/386* (2013.01); *H01M 4/483* (2013.01); *H01M 4/485* (2013.01); *H01M 4/625* (2013.01); *H01M 4/131* (2013.01);
(Continued)

(58) Field of Classification Search
CPC .... H01M 4/366; H01M 4/0402; H01M 4/043; H01M 4/0471; H01M 4/386; H01M 4/483; H01M 4/485; H01M 4/625; H01M 4/131; H01M 4/134; H01M 10/0525
See application file for complete search history.

(56) References Cited

U.S. PATENT DOCUMENTS 7,972,727 B2 7/2011 Christensen et al.
8,080,335 B2 * 12/2011 Kawakami ............ H01G 9/155
252/182.1
(Continued)

FOREIGN PATENT DOCUMENTS

KR 10-0589367 B1 6/2006
KR 10-2012-0123186 A 11/2012
KR 10-2016-0085089 A 7/2016

OTHER PUBLICATIONS

Lee et al., Graphite-FeSi alloy composites as anode materials for rechargeable lithium batteries, Journal of Power Sources, 112 (2002) pp. 649-654 (Year: 2002).*

*Primary Examiner* — Helen Oi K Conley
(74) *Attorney, Agent, or Firm* — Knobbe, Martens, Olson & Bear, LLP

(57) ABSTRACT

A composite electrode active material includes: a core portion including a silicon-based alloy; and a shell portion disposed on the core portion and including a coating layer, wherein the coating layer includes an amorphous carbon material and a lithium titanium oxide. A lithium battery including the composite electrode active material and a method of manufacturing the composite electrode active material are also provided.

15 Claims, 5 Drawing Sheets

(51) Int. Cl.
  *H01M 4/38*       (2006.01)
  *H01M 4/48*       (2010.01)
  *H01M 4/485*      (2010.01)
  *H01M 4/62*       (2006.01)
  H01M 4/131        (2010.01)
  H01M 4/134        (2010.01)
  H01M 10/0525      (2010.01)

(52) U.S. Cl.
  CPC ........ *H01M 4/134* (2013.01); *H01M 10/0525* (2013.01)

(56) References Cited

U.S. PATENT DOCUMENTS

| | | |
|---|---|---|
| 10,038,185 B2 | 7/2018 | Jeong et al. |
| 2010/0143798 A1* | 6/2010 | Zhamu .................. H01M 4/133 429/212 |
| 2011/0165464 A1* | 7/2011 | Yew ...................... H01M 4/134 429/223 |
| 2012/0270108 A1 | 10/2012 | Shin et al. |
| 2013/0059203 A1* | 3/2013 | Hong .................... H01M 4/134 429/213 |

* cited by examiner

COMPOSITE ELECTRODE ACTIVE MATERIAL, LITHIUM BATTERY INCLUDING THE SAME, AND PREPARATION METHOD THEREOF

CROSS-REFERENCE TO RELATED APPLICATION

Any and all applications for which a foreign or domestic priority claim is identified in the Application Data Sheet as filed with the present application are hereby incorporated by reference under 37 CFR 1.57. This application claims the benefit of Korean Patent Application No. 10-2015-0142164, filed on Oct. 12, 2015, in the Korean Intellectual Property Office, the disclosure of which is incorporated herein in its entirety by reference.

BACKGROUND

Field

This disclosure relates to a composite electrode active material, a lithium battery including the lithium battery, and a method of manufacturing the composite electrode active material.

Description of the Related Technology

A lithium battery, more specifically a lithium ion battery (LIB), has been used as a power source for many portable devices due to its high energy density and ease of design. Recently, as the LIB has been used as a power source for electric vehicles or for power storage in addition to a power source for portable information technology (IT) devices, research has been sharply focused on the study of a LIB that has high energy density and a long lifespan.

In particular, research on an electrode active material having high capacity has been especially active. More specifically, there has been an increase in research activity to identify a high capacity electrode active material, made of semi-conductive elements other than commercially active graphite as a negative active material.

However, among the semi-conductive elements, a silicon-based negative active material causes side-reaction with an electrolyte and results in volumetric expansion and contraction during repetitive charging and discharging of the LIB. Thus, the rate capability and lifespan characteristics of the LIB including the silicon-based negative active material may degrade as a result.

Therefore, there is a need to develop an electrode active material having a novel structure for improving rate capability and lifespan characteristics, a lithium battery including the electrode active material, and a method of manufacturing the electrode active material.

SUMMARY

Some embodiments include a composite electrode active material having improved rate characteristics and lifespan characteristics.

Some embodiments include a lithium battery including the composite electrode active material.

Some embodiments include a method of manufacturing a composite electrode active material having improved rate characteristics and lifespan characteristics.

Additional aspects will be set forth in part in the description which follows and, in part, will be apparent from the description, or may be learned by practice of the presented embodiments.

In some embodiments, a composite electrode active material includes: a core portion including a silicon-based alloy; and a shell portion disposed on the core portion and including a coating layer, wherein the coating layer includes an amorphous carbon material and a lithium titanium oxide.

In some embodiments, a lithium battery includes: a positive electrode; a negative electrode including the composite electrode active material; and an electrolyte disposed between the positive electrode and the negative electrode.

In some embodiments, a method of manufacturing a composite electrode active material includes: mixing a core portion including a silicon-based alloy, an amorphous carbon material, and a lithium titanium oxide by using a dry or wet mixing method to obtain a mixture; and performing a heat treatment on the mixture in an inert atmosphere to prepare a composite electrode active material.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
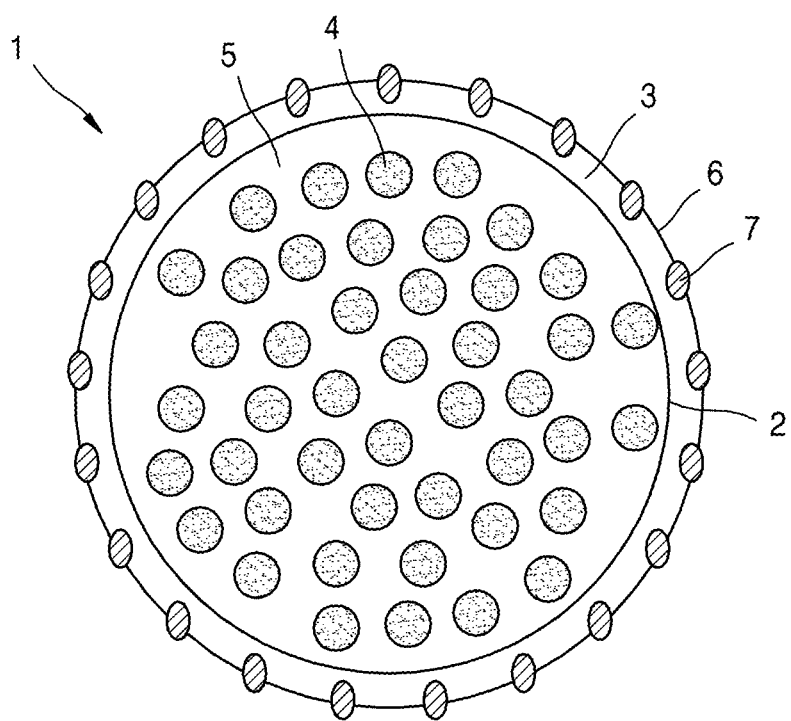
FIG. 1 is a diagram schematically illustrating a composite electrode active material according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a composite electrode active material according to an exemplary embodiment, a lithium battery including the composite electrode active material, and a method of preparing the composite electrode active material are explained in detail. Provided herein below are exemplary embodiments and they should not limit the scope of the present disclosure.

According to an embodiment, there is provided a composite electrode active material including: a core portion including a silicon-based alloy; and a shell portion including a coating layer that is disposed on the core portion, wherein the coating layer includes an amorphous carbon material and a lithium titanium oxide.

An example of a negative active material that is widely commercialized is graphite, and graphite has a theoretical capacity of about 327 mAh/g. However, to be used in an electric vehicle or the like requiring high capacity, there is a need to develop a negative active material having a higher capacity than the theoretical capacity of graphite. In this regard, an alloy including a semiconductor element, such as silicon, germanium or tin, may be prepared as a high-capacity negative active material.

In some embodiments, the negative active material may include a core portion including a silicon-based alloy; and a shell portion including a coating layer that is disposed on the core portion.

The composite negative active material may include a core portion including a high-capacity silicon-based alloy. However, if the high-capacity silicon-based alloy in the core portion is the only material used as an electrode active material, the high-capacity silicon-based alloy may undergo volumetric expansion during charging. As charging and discharging cycles are repeatedly performed, a lithium battery including the high-capacity silicon-based alloy as an electrode active material may undergo reduction in capacity of the lithium battery as well as the volumetric expansion of the electrode active material. In addition, due to the volumetric expansion of the electrode active material, a conduction path may be broken and a side reaction with an electrolyte may be caused upon constant exposure of a surface of the electrode active material. To solve such problems above, several methods for simultaneously suppressing the volumetric expansion of the electrode active material and modifying the surface of the electrode active material have been proposed.

The method for modifying the surface of the electrode active material, e.g., the high-capacity silicon-based alloy, includes a coating method using a conducting agent. However, a temperature at which a coating method (e.g., carbonization) is performed is high in a range of about 700° C. to about 1,200° C., and accordingly, the electrode active material may undergo crystal coarsening. Thus, when crystals of the electrode active material become larger, the electrode active material may undergo heavy volumetric expansion. Accordingly, a solid electrolyte interface (SEI) layer may be constantly formed on the surface of the electrode active material, i.e., the silicon-based alloy, while an initial efficiency of the lithium battery including the electrode active material decreases. In addition, a capacity retention rate of the lithium battery including the electrode active material rapidly decreases, thereby degrading lifespan of the lithium battery.

Therefore, to address these problems, provided herein are embodiments of the composite electrode active material including: the core portion including the silicon-based alloy; and the shell portion including the coating layer that is disposed on the core portion, the coating layer including the amorphous carbon material and the lithium titanium oxide.

The arrangement of the shell portion, which includes the amorphous carbon material and the lithium titanium oxide, on the core portion may suppress volumetric expansion of the core portion including the silicon-based alloy and a side reaction with an electrolyte, thereby improving rate characteristics and lifespan characteristics of the lithium battery including the composite electrode active material.

FIG. 1 is a diagram schematically illustrating a composite electrode active material 1 according to an exemplary embodiment.

In FIG. 1, the composite electrode active material 1 includes a core portion 2 and a shell portion 3, wherein the shell portion 3 includes a coating layer 6 including lithium titanium oxide particles 7 dispersed therein.

In detail, the coating layer 6 is a continuous layer formed of an amorphous carbon material. In the coating layer 6, the lithium titanium oxide particles 7 are arranged in a dispersed manner. The arrangement of the lithium titanium oxide particles 7 in the coating layer 6 formed of the amorphous carbon material may provide an appropriately secured conduction path for lithium ions, so as to further improve rate characteristics of a lithium battery including the composite electrode active material 1.

The amorphous carbon material may include at least one of soft carbon, hard carbon, coal pitch, petroleum pitch, mesophase pitch carbide, calcined cokes, and a combination thereof. The amorphous carbon material, may include, for example, at least one of coal pitch and petroleum pitch.

The coating layer 6 including the amorphous carbon material may suppress formation of an SEI layer during initial charging, the SEI layer being formed by a reaction between an electrolyte and a surface of the core portion including the silicon-based alloy. In this regard, the coating layer 6 may maintain excellent electrical conductivity of the composite negative active material including the coating layer 6.

An amount of the amorphous carbon material may be in a range of about 1 part by weight to about 30 parts by weight based on 100 parts by weight of the core portion including the silicon-based alloy. For example, the amount of the amorphous carbon material may be in a range of about 1 part by weight to about 25 parts by weight based on 100 parts by weight of the core portion including the silicon-based alloy. For example, the amount of the amorphous carbon material may be in a range of about 1 part by weight to about 20 parts by weight based on 100 parts by weight of the core portion including the silicon-based alloy.

When the amount of the amorphous carbon material is within the above range, the formation of the SEI layer formed by a reaction with an electrolyte may be suppressed. Accordingly, the composite negative active material including the amorphous carbon material may maintain excellent electrical conductivity thereof, and furthermore, may efficiently suppress volumetric expansion of the core potion including the silicon-based alloy. In this regard, a lithium battery including the composite negative active material may have improved lifespan characteristics.

A thickness of the coating layer 6 is not particularly limited, but may be in a range of about 5 nm to about 300 nm.

In some embodiments, the lithium titanium oxide may be represented by Formula 1.

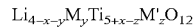

Formula 1

In Formula 1, $0 \le x \le 1$, $0 \le y \le 1$, and $0 \le z \le 1$,

M may be at least one element selected from lanthanum (La), terbium (Tb), gadolinium (Gd), cerium (Ce), praseodymium (Pr), neodymium (Nd), samarium (Sm), barium (Ba), strontium (Sr), calcium (Ca), magnesium (Mg), and a combination thereof, M' may be at least one element selected from vanadium (V), chrome (Cr), niobium (Nb), iron (Fe), nickel (Ni), cobalt (Co), manganese (Mn), tungsten (W), aluminum (Al), gallium (Ga), copper (Cu), molybdenum (Mo), phosphorus (P), or a combination thereof.

In some embodiments, the lithium titanium oxide may be represented by Formula 1-1.

$$Li_{4-x'}Ti_{5+x'}O_{12} \qquad \text{Formula 1-1}$$

In Formula 1-1, $0 \leq x' \leq 1$.

For example, the lithium titanium oxide may be $Li_4Ti_5O_{12}$, which may have high-speed charging ability, long lifespan, and high-thermal stability.

An average particle diameter of the lithium titanium oxide particles 7 may be in a range of about 0.1 nm to about 500 nm. For example, the average particle diameter of the lithium titanium oxide particles 7 may be in a range of about 0.1 nm to about 300 nm, e.g., about 0.1 nm to about 200 nm.

The average particle diameter refers to "D50", which is a value of particle diameter at 50% in a cumulative distribution curve in which the particles are cumulatively distributed from the smallest to the largest particles based on 100% of the total number of the particles The D50 may be measured by methods widely known in the art, and for example, may be measured by using a particle size analyzer, a transmission electron microscope (TEM) or a scanning electron microscope (SEM). As another example, the D50 may be measured by using a dynamic light-scattering device, and then, performing data analysis to count the number of particles in each size range to calculate the average particle diameter.

When the average particle diameter of the lithium titanium oxide particles 7 is within the above range, powder rate of the lithium titanium oxide particles 7 may be appropriately controlled. In this regard, a lithium battery including the lithium titanium oxide particles 7 may have efficiently improved rate characteristics.

An amount of the lithium titanium oxide may be in a range of about 0.1 part by weight to about 10 parts by weight based on 100 parts by weight of the core portion. For example, the amount of the lithium titanium oxide may be in a range of about 0.1 parts by weight to about 8 parts by weight based on 100 parts by weight of the core portion. For example, the amount of the lithium titanium oxide may be in a range of about 0.1 parts by weight to about 7 parts by weight based on 100 parts by weight of the core portion. When the amount of the lithium titanium oxide is within the above range, a lithium battery maintaining high capacity thereof while having improved rate characteristics and lifespan characteristics may be obtained.

The core portion 2 may include a mixture of active silicon and inactive silicon. For example, active silicon may be directly associated with capacity of the core portion 2 while inactive silicon having an inactive matrix structure may suppress volumetric expansion of the core portion 2.

In some embodiments, the core portion 2 may include a silicon phase of active silicon and an silicon-M phase of inactive silicon, wherein M may include at least one element selected from Ni, Co, arsenic (As), Cr, Cu, Fe, Mg, Mn, and yttrium (Y).

An amount of the silicon phase of active silicon may be in a range of about 50% to about 90% based on the total sum of atomic fractions (100%) of active silicon and inactive silicon in the core portion. When the amount of the silicon phase of active silicon is within the above range, the volumetric expansion of the core portion 2 may be efficiently suppressed during charging and discharging of an electrode active material including the silicon phase of active silicon. In addition, the core portion 2 may have excellent capacity characteristics.

The core portion 2 may include $Si_aFe_b$ represented by Formula 2.

$$Si_aFe_b \qquad \text{Formula 2}$$

In Formula 2,
$50 \leq a \leq 90$, $10 \leq b \leq 50$, and $a+b=100$.

The composite electrode active material 1 may be a negative active material.

In some embodiments, there is provided a lithium battery including a positive electrode; a negative electrode; and an electrolyte between the positive electrode and the negative electrode, wherein the negative electrode includes the composite electrode active material. The lithium battery may be prepared by, for example, as follows.

The negative electrode may be, for example, prepared as follows.

To prepare the negative electrode, a negative active material composition may be prepared by mixing a composite negative active material, a binder, and a solvent. If necessary, the negative active material composition may further include a conducting agent to prepare the negative electrode. The negative electrode may be prepared by directly coating on a copper current collector and drying with the negative active material composition to form a negative active material film. Alternatively, the negative electrode may be prepared by casting the negative active material composition on a separate support to form a negative active material film, which may then be separated from the support and laminated on the copper current collector.

In some embodiments, composite negative active material may include a core portion including a silicon-based alloy; and a shell portion disposed on the core portion and including a coating layer, wherein the coating layer includes an amorphous carbon material and a lithium titanium oxide. A composition of the core portion, compositions, amounts, and thicknesses of the coating layer and the amorphous carbon material, and a composition and an amount of the lithium titanium oxide may be the same as those defined above, and thus descriptions thereof will be omitted.

Examples of the binder include polyacrylate (PAA), lithium polyacrylate substituted with lithium (LiPAA), vinylidene fluoride/hexafluoropropylene copolymer, polyvinylidene fluoride, polyacrylonitrile, polymethyl methacrylate, polytetrafluoroethylene (PTFE), and styrene-butadiene rubber-based polymer.

Examples of the solvent include N-methylpyrrolidone (NMP), acetone, and water, but are not limited thereto. Any suitable binder and solvent used in the art may be used.

Examples of the conductive material include carbon fiber such as carbon black, graphite granules, natural graphite, artificial graphite, acetylene black, or Ketjen black; carbon nanotube or metal powder, metal fiber, or metal tube such as copper, nickel, aluminum, or silver; and a conductive polymer such as a polyphenylene derivative, but are not limited thereto. Any suitable conductive material used in the art may be used. Amounts of the negative active material, the conductive material, the binder, and the solvent are similar to those generally used in the art of lithium batteries.

The positive electrode may be prepared in the same manner as the negative electrode except that a positive active material is used instead of the negative active material.

The positive electrode may be prepared as follows.

As in the case of preparing the negative electrode, a positive active material composition may be prepared by mixing a positive active material, a binder, a solvent, and if necessary, a conductive material, and then directly coating the positive active material composition on an aluminum current collector to prepare a positive electrode. Alternatively, the positive electrode may be prepared by casting the positive active material composition on a separate support to form a positive active material film, which may then be separated from the support and laminated on the aluminum current collector.

As the positive active material, any material generally used in the art may be used without particular limitation. However, in further detail, the positive active material may be a compound that allows reversible intercalation and deintercalation of lithium ions. In further detail, the positive active material may include a compound represented by one of formulae such as $Li_aA_{1-b}B'_bD'_2$ (where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In formulae above, A may include Ni, Co, Mn, or a combination thereof; B' may include a least one of Al, Ni, Co, Mn, Cr, Fe, Mg, strontium (Sr), V, a rare earth element, or a combination thereof; D' may include oxygen (O), fluorine (F), sulfur (S), phosphorus (P), or a combination thereof; E may include Co, Mn, or a combination thereof; F' may include F, S, P, or a combination thereof; G may include Al, Cr, Mn, Fe, Mg, La, Ce, Sr, V, or a combination thereof; Q may include Ti, Mo, Mn, or a combination thereof; I' may include Cr, V, Fe, Sc, Y, or a combination thereof; J may include V, Cr, Mn, Co, Ni, Cu, or a combination thereof.

In some embodiments, the positive active material may include $LiMn_2O_4$, $LiNi_2O_4$, $LiCoO_2$, $LiNiO_2$, $LiMnO_2$, $Li_2MnO_3$, $LiFePO_4$, and $LiNi_xCo_yO_2$ (where $0 < x \leq 0.15$ and $0 < y \leq 0.85$). For example, the positive active material may include $Li_{1+x}(M)_{1-x}O_2$ (where $0.05 \leq x \leq 0.2$), wherein M is a transition metal. Examples of M include Ni, Co, Mn, Fe, and Ti, but are not limited thereto.

A surface of the compound may have a coating layer, or the compound and a compound having a coating layer may be used as a mixture. The coating layer may include a compound of a coating element such as an oxide of a coating element, a hydroxide of a coating element, an oxyhydroxide of a coating element, an oxycarbonate of a coating element, or a hydroxyl carbonate of a coating element. The compound forming the coating layer may be amorphous or crystalline. The coating element included in the coating layer may include Mg, Al, Co, K, Na, Ca, Si, Ti, V, Sn, Ge, Ga, B, As, Zr or a combination thereof. A formation process (e.g., spray coating or dip-coating) of the coating layer may be any coating method that does not adversely affect physical properties of the positive active material by using the elements above, and the coating method may be well understood by those of ordinary skill in the art, so the description of the coating method is omitted in the present specification.

In the positive active material composition, the conductive material, the binder, and the solvent may be the same as those defined in connection with the preparation of the negative electrode. If necessary, a plasticizer may be further added to the negative active material composition and the positive active material composition to thereby form apertures inside an electrode plate.

Amounts of the positive active material, the conductive material, the binder, and the solvent are similar to those generally used in the art of lithium batteries. Depending on the use and features of the lithium battery, at least one of the conductive material, the binder, and the solvent may be omitted.

Then, a separator to be disposed between the negative electrode and the positive electrode is prepared. The separator used herein may be any suitable separator used in the art of lithium batteries. A separator with low resistance against ionic movement of electrolytes and an excellent electrolyte-wetting capacity may be used. For example, the separator may be selected from glass fiber, polyester, Teflon, polyethylene, polypropylene, polytetrafluoroethylene (PTFE), or a combination thereof, and may be in the form of a woven or a non-woven fabric. For example, the separator used in a lithium ion battery may be windable separator made of such as polyethylene or polypropylene, whereas the separator used in a lithium ion polymer battery may be one which has excellent wetting capacity of an organic electrolyte. For example, the separator may be prepared as follows.

A separator composition may be prepared by mixing a polymer resin, a filler, and a solvent. The separator composition may be directly coated on an upper portion of an electrode and dried to form a separator. Alternatively, the separator composition may be cast on a support and dried, and a separator film exfoliated from the support may be laminated on the upper portion of the electrode to form a separator.

The polymer resin to be used in preparation of the separator is not particularly limited, and any material used as a binder of an electrode plate may be used. For example, vinylidene fluoride/hexafluoropropylene copolymer, polyvinylidene fluoride (PVDF), polyacrylonitrile, polymethyl methacrylate, or a combination thereof may be used.

Then, an electrolyte may be prepared.

In some embodiments, the electrolytes may be an organic electrolyte. In addition, the electrolyte may be in a solid form, for example, boron oxide or lithium oxynitride, but are not limited thereto. Any suitable electrolyte which may be used as solid electrolytes in the art may be used. The solid electrolyte may be formed at the negative electrode by a method such as sputtering.

In some embodiments, an organic electrolyte may be prepared. The organic electrolyte may be prepared by dissolving a lithium salt in an organic solvent.

In some embodiments, organic solvent used herein may be any suitable organic solvent used in the art, and examples thereof include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulforane, dichloroethane, chlorobenzene, nitrobenzene, diethylene glycol, dimethyl ether, and a combination thereof.

In some embodiments, lithium salt used herein may be any suitable lithium salt used in the art, and examples thereof include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, and a combination thereof.

Figure 2:
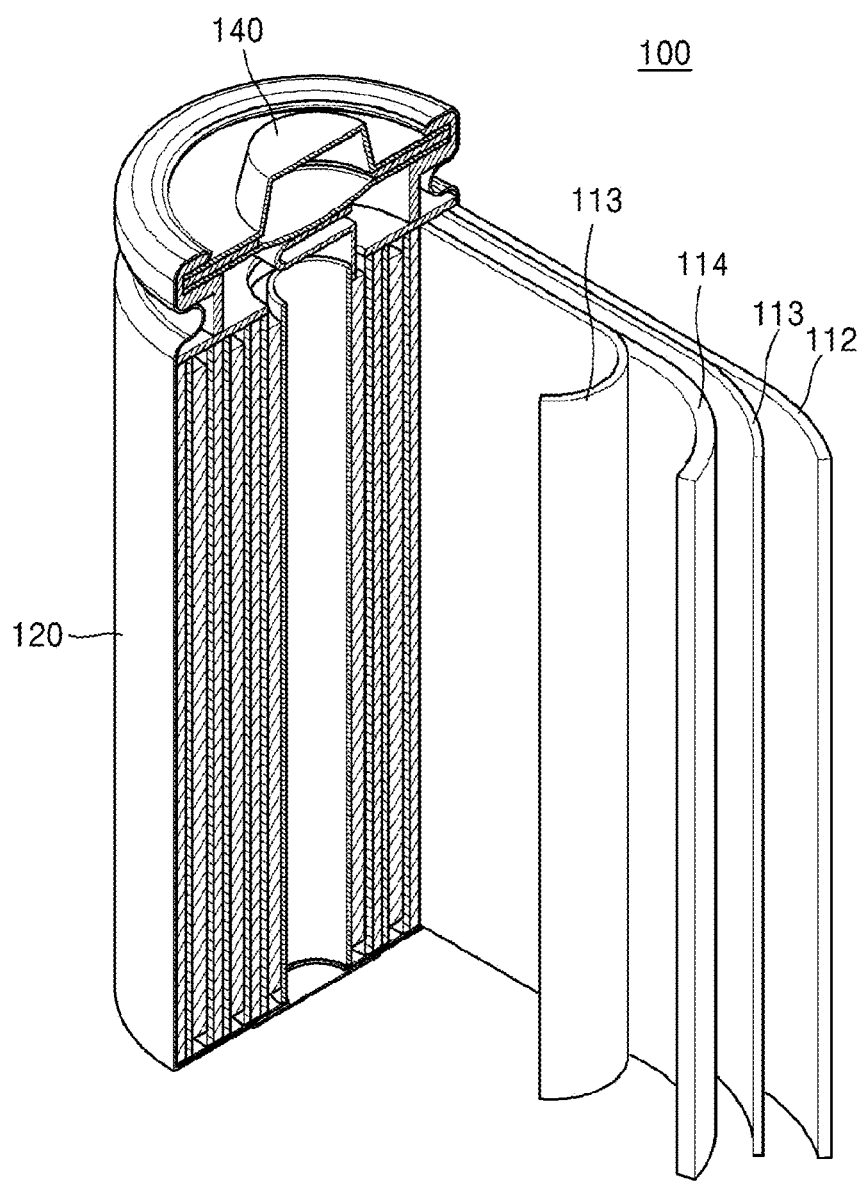
FIG. 2 is an exploded perspective diagram illustrating a lithium battery according to an exemplary embodiment.

As shown in FIG. 2, a lithium battery 100 includes a positive electrode 114, a separator 113, and a negative electrode 112. The positive electrode 114, the separator 113, and the negative electrode 112 are wound or folded to be received into a battery container 120. Then, an organic electrolyte is introduced into the battery container 120, and sealed with a sealing element 140 thereby completing a manufacture of the lithium battery 100. The battery container 120 may be cylindrical, rectangular-shaped, or thin film-shaped. For example, the lithium battery 100 may be a large thin film battery. The lithium battery 100 may be a lithium ion battery.

A separator may be disposed between the positive electrode and the negative electrode to thereby form an electrode assembly. Once the electrode assembly is laminated in a bicell structure, an organic electrolyte may be impregnated thereinto, and the resulting product is put into a pouch and sealed to thereby complete a lithium ion polymer battery.

Furthermore, a plurality of electrode assemblies may be laminated to form a battery pack, and thus the formed battery pack may be used in all devices requiring high capacity and high power, for example, notebooks, smartphones, and electric vehicles.

In some embodiments, there is provided a method of preparing a composite electrode active material, the method including: mixing a core portion including a silicon-based alloy, an amorphous carbon material, and a lithium titanium oxide by using a dry or wet mixing method to obtain a mixture; and performing heat treatment on the mixture in an inert atmosphere to prepare a composite electrode active material.

The core portion including the silicon-based alloy may be prepared according to ball mill, high-energy ball mill, planetary mill, stirred ball mill, vibration mill, or melt spinning methods.

For example, a milling processing, such as ball mill, high-energy ball mill, planetary mill, stirred ball mill, and vibration mill, may be performed by using a material that does not react with silicon and an organic material and is chemically unstable. The material may be a zirconia material or a stainless material. Balls used in ball mill, high-energy ball mill, planetary mill, stirred ball mill, and vibration mill may have an average particle diameter in a range of about 0.1 mm to about 10 mm, but are not limited thereto.

The milling processing may be performed for appropriate number of hours determined by the requirement of the particle size of a starting material, size of the final resulting material, and size of the balls used in a ball mill, high-energy ball mill, planetary mill, stirred ball mill, and vibration mill. For example, the milling processing may be performed for about 0.5 hour to about 10 hours.

The melt spinning method used herein is a technique used for solidification by rapid cooling, and for example, master alloy melts are placed in a melt spinning apparatus using high-frequency induction to be dripped or injected onto a wheel rotating at a high speed, and cooled, causing rapid solidification. Here, the master alloy melts are subjected to rapid solidification at a cooling rate in a range of about $10^3$ K/sec to about $10^7$ K/sec.

Since the master alloy melts are rapidly cooled on the wheel rotating at a high speed, the master alloy melts are injected in the form of a ribbon. Such a ribbon-shape and a size of silicon particles distributed in the alloy may be determined depending on a cooling rate. To obtain fine silicon particles, for example, the master alloy melts may be cooled at a cooling rate of about 1,000° C./s or more. In addition, to obtain homogeneous silicon particles, a thickness of the ribbon-shaped injecting material may be adjusted in a range of about 5 μm to about 20 μm, e.g., about 7 μm to about 16 μm. Then, the ribbon-shaped alloy injecting material undergone rapid solidification may be pulverized in the form of powder. A pulverizing apparatus is not particularly limited, but for example, an atomizer, a vacuum mill apparatus, a ball mill apparatus, a planetary ball apparatus, a beads mill apparatus, or a jet mill apparatus may be used.

The core portion including the silicon-based alloy is mixed with the amorphous carbon material and the lithium titanium oxide by using a dry or wet mixing method to obtain a mixture.

An example of the dry mixing method includes a milling processing, such as vacuum mill, ball mill, planetary ball, beads mill, and jet mill methods. Regardless of types of the milling methods, a mixed powder in which the mixture is homogeneously dispersed may be obtained.

As an example of the wet mixing method, the core portion and the lithium titanium oxide are added to and mixed with the amorphous carbon material dissolved in an organic solvent to thereby prepare a slurry. Here, the organic solvent may be N-2-methyl-2-pyrrolidone (NMP), tetrahydrofuran (THF), acetone, or a mixture thereof. When the slurry is dried, a mixed powder may be obtained. Here, a drying method applied to the mixed powder is not particularly limited, but the mixed powder may be spray-dried. By controlling a spraying pressure or a size of droplet, the spry-drying may be used to obtain the mixed powder having a homogeneous composition. The mixed powder obtained therefrom is subjected to heat treatment to thereby prepare an electrode active material accordingly having a homogeneous composition. The electrode active material may be used in the lithium battery in terms of improving battery performance.

The heat treatment may be performed at a temperature in a range of about 400° C. to about 700° C. in an inert atmosphere. The inert atmosphere may be filled with an inert gas, such as nitrogen gas or argon gas. The heat treatment may be performed for about 10 minutes to about 10 hours. When performing the heat treatment on the mixture at a temperature within the range above, a layer other than a Si phase and a SiM phase is not formed while a passive layer is formed in the absence of changes in the Si phase and the SiM phase. Accordingly, the lithium battery including the prepared composite negative active material may have improved rate characteristics and lifespan characteristics.

Hereinafter, examples of the disclosure will be described below. However, the examples are presented for illustrative purpose only, and do not limit the scope of the present disclosure.

Also, some contents which are not described herein may be obvious to one of ordinary skill in the art, and thus, may not be presented herein.

EXAMPLES

Preparation of Composite Electrode Active Materials

Example 1: Preparation of a Composite Electrode Active Material

Si powder having an average particle diameter of about 5 um (Kojundo Chemical Laboratory Co., Ltd., purity of 99% or greater) and Fe powder having an average particle diameter in a range of about 3 μm to about 5 μm (Kojundo Chemical Laboratory Co., Ltd., purity of 99% or greater) were prepared as starting materials. Then, the Si powder and Fe powder were mixed at a molar ratio of about 3:1 to form a mixture. The mixture and stainless steel balls having a diameter of about 5 mm were mixed in a weight ratio of about 1:5, and then, mechanical alloying was performed thereon at a rotational speed of about 1,500 rmp for about 120 minutes by using a high energy ball mill (Retsch, Emax) to prepare a $Si_3Fe$ core portion.

The $Si_3Fe$ core portion, carboniferous pitch (Cr-Tech Company, 77% of fixed carbon), and $Li_4Ti_5O_{12}$ powder having an average particle diameter of about 100 nm were mixed together in a weight ratio of about 100:20:1, and then, were placed in a ball mill using zirconia balls each having a diameter of about 5 mm. The ball milling was performed for about 2 hours to prepare a mixture. The mixture was then placed in a furnace, and a heat treatment was performed thereon in a nitrogen gas atmosphere at a temperature of about 600° C. for 2 hours, so as to prepare a composite electrode active material. The composite active material included the $Si_3Fe$ core portion and the carboniferous pitch as a coating layer formed on the core portion, wherein $Li_4Ti_5O_{12}$ particles were arranged on the coating layer in a dispersed manner.

Example 2: Preparation of a Composite Electrode Active Material

A composite electrode active material was prepared in the same manner as in Example 1, except that the $Si_3Fe$ core portion, the carboniferous pitch (CR-tech Company, 77% of fixed carbon), and the $Li_4Ti_5O_{12}$ powder having an average particle diameter of about 100 nm were mixed in a weight ratio of about 100:20:2 instead of about 100:20:1.

Example 3: Preparation of a Composite Electrode Active Material

A composite electrode active material was prepared in the same manner as in Example 1, except that the $Si_3Fe$ core portion, the carboniferous pitch (CR-tech Company, 77% of fixed carbon), and the $Li_4Ti_5O_{12}$ powder having an average particle diameter of about 100 nm were mixed in a weight ratio of about 100:20:3 instead of about 100:20:1.

Example 4: Preparation of a Composite Electrode Active Material

Si powder having an average particle diameter of about 5 μm (Kojundo Chemical Laboratory Co., Ltd., purity of 99% or greater) and Fe powder having an average particle diameter in a range of about 3 μm to about 5 μm (Kojundo Chemical Laboratory Co., Ltd., purity of 99% or greater) were prepared as starting materials. Then, the Si powder and Fe powder were mixed at a molar ratio of about 3:1 to form a mixture. The mixture and stainless steel balls having a diameter of about 5 mm were mixed in a weight ratio of about 1:5, and then, mechanical alloying was performed thereon at a rotational speed of about 1,500 rmp for about 120 minutes by using a high energy ball mill (Retsch, Emax) to prepare a $Si_3$ Fe core portion.

Carboniferous pitch (CR-tech Company, 77% of fixed carbon) and a mixed solution of NMP and THF (at a volume ratio of about 4:6) were mixed together, and then, were stirred using a magnetic stirrer to form a mixed solution. The $Si_3Fe$ core portion and $Li_4Ti_5O_{12}$ powder having an average particle diameter of about 100 nm were added thereto, and then, stirred to prepare a slurry. Here, the amount of the $Li_4Ti_5O_{12}$ to be added to prepare the slurry was about 2 parts by weight based on 100 parts by weight of the $Si_3Fe$, and the amount of the carboniferous pitch was about 20 parts by weight based on 100 parts by weight of the $Si_3Fe$.

The slurry was spray-dried, and then, placed in a furnace. A heat treatment was performed thereon in a nitrogen gas atmosphere at a temperature of about 600° C. for about 2 hours, so as to prepare a composite electrode active material. The composite active material included the $Si_3Fe$ core portion and the carboniferous pitch as a coating layer formed on the $Si_3Fe$ core portion, wherein $Li_4Ti_5O_{12}$ particles were arranged on the coating layer in a dispersed manner.

Comparative Example 1: Preparation of an Electrode Active Material

The $Si_3Fe$ core portion prepared according to Example 1 was used as an electrode active material.

Comparative Example 2: Preparation of a Composite Electrode Active Material

A composite electrode active material was prepared in the same manner as in Example 1, except that the $Si_3Fe$ core portion and the carboniferous pitch (CR-tech Company, 77% of fixed carbon) were mixed in a weight ratio of about 100:20 to prepare a composite electrode active material including the $Si_3Fe$ core portion and the carboniferous pitch as a coating layer formed on the $Si_3Fe$ core portion, instead of mixing the $Si_3Fe$ core portion, the carboniferous pitch (CR-tech Company, 77% of fixed carbon), and the $Li_4Ti_5O_{12}$ powder having an average particle diameter of about 100 nm in a weight ratio of about 100:20:1.

Preparation of Lithium Batteries

Example 5: Manufacture of a Lithium Battery (i.e., a Coin-Type Cell)

The composite electrode active material powder prepared according to Example 1 and graphite (BTR natural graphite) were mixed at a ratio of about 2:8 to form a mixed negative electrode active material. The mixed negative electrode active material, a carboxymethyl cellulose (CMC) thickener, and a styrene-butadiene rubber (SBR) binder were mixed in a weight ratio of about 97:1.5:1.5 in distilled water to form a slurry for a negative active material.

The slurry for the negative active material was coated on a copper current collector having a thickness of 10 μm, and then, the result was dried at a temperature of about 110° C. for about 15 minutes to manufacture a negative electrode plate, which was further dried to manufacture a coin-type cell (CR2032 type) having a diameter of about 20 mm.

Meanwhile, to manufacture a positive electrode plate (i.e., an NCM plate), $Li[Ni_{0.56}Co_{0.22}Mn_{0.22}]O_2$ powder (available from Samsung SDI, Gyeonggi-do, Republic of Korea) as a positive electrode active material having an average particle diameter of about 15 μm and Denka Black as a conducting agent were uniformly mixed in a weight ratio of about 92:4, and then, a polyvinylidene fluoride (PVDF) solution as a binder was added thereto such that the positive electrode active material, the conducting agent, and the binder were mixed in a weight ratio of about 92:4:4 to form a slurry for a positive active material. The slurry for the positive active material was coated on a surface of a 15 μm-thick aluminum collector to a thickness of about 55 μm by using an applicator, and then, dried at a temperature of about 120° C. for about 3 hours or more, thereby manufacturing an NCM positive electrode plate.

In manufacturing a coin-type cell, the NCM positive electrode plate as a counter electrode, a polyethylene separator (STAR®20) having a thickness of about 20 μm, and an electrolyte solution of 1.5 M $LiPF_6$ dissolved in a mixed solvent of ethylene carbonate (EC), diethyl carbonate (DEC), and fluoroethylene carbonate (FEC) in a volume ratio of about 5:70:25 were used.

Examples 6 to 8: Manufacture of Lithium Batteries (i.e., Coin-Type Cells)

Lithium batteries were prepared in the same manner as in Example 5, except that the negative electrode active material of composite electrode active materials prepared according to Examples 2 to 4 were each used instead of the negative electrode active material of composite electrode active material prepared according to Example 1.

Comparative Examples 3 and 4: Manufacture of Lithium Batteries (i.e., Coin-Type Cells)

Lithium batteries were prepared in the same manner as in Example 5, except that the negative electrode active material of the electrode active material prepared according to Comparative Example 1 and the negative electrode active material of composite electrode active material prepared according to Comparative Example 2 were each used instead of the negative electrode active material of composite electrode active material prepared according to Example 1.

Analytical Example 1: Scanning Electronic Microscope (SEM) Images

The surface of the composite electrode active material prepared according to Example 3 was observed under an SEM (available from Hitachi, Model: S-5500) at a 50,000 magnification. The result is shown in FIG. 3.

Figure 3:
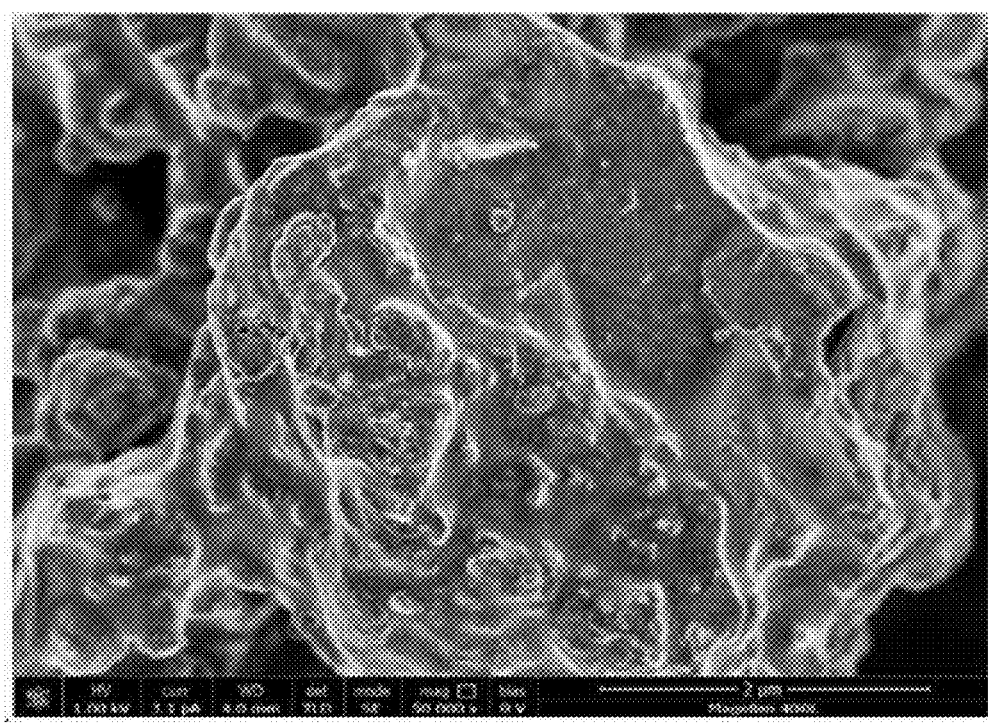
FIG. 3 shows a scanning electron microscope (SEM) image at a 50,000× magnification of a composite negative active material prepared according to Example 3.

Referring to FIG. 3, it was confirmed that the coating layer was formed on the surface of the composite electrode active material prepared according to Example 3.

Evaluation Example 1: Evaluation of Charge and Discharge Characteristics 1.1: Evaluation of Rate Characteristics The lithium batteries (i.e., coin-type cells) prepared according to Examples 5 to 7 and Comparative Examples 3 and 4 were each charged with a constant current of 0.1 C rate at a temperature of about 25° C. until a voltage of the lithium batteries reached about 4.20 V (vs. Li), and then, were each cut-off at a constant current of 0.05 C rate in a constant voltage mode maintaining the voltage of about 4.20 V. Subsequently, the lithium batteries were discharged with a constant current of 0.1 C rate until the voltage reached about 2.8 V (vs. Li) (Formation process, $1^{st}$ cycle). This cycle of charging and discharging was repeated 2 times, thereby completing the formation process.

Figure 4:
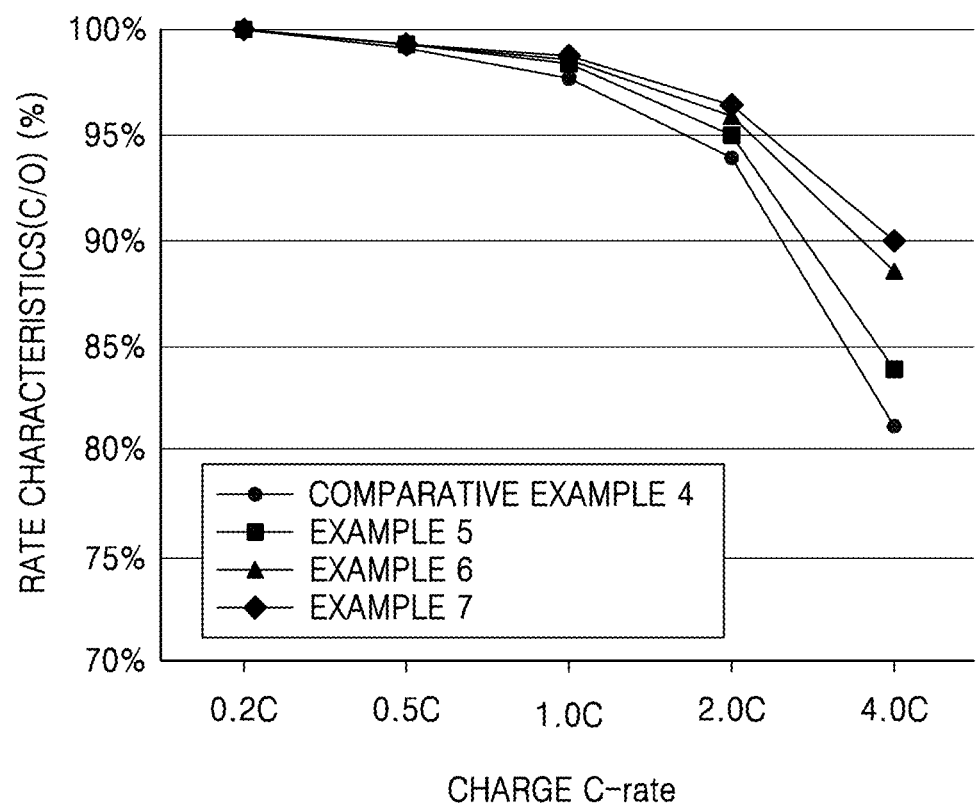
FIG. 4 shows a graph of rate characteristics (percent, %) versus C-rates illustrating, for lithium batteries (i.e., coin-type cells) prepared according to Examples 5 to 7 and Comparative Example 4, the charge capacity thereof measured at a temperature of 25° C. according to increasing discharge rates of 0.2 C, 0.5 C, 1.0 C, 2.0 C, and 4.0 C as being calculated relative to 0.2 C charge capacity.

The lithium batteries (i.e., coin-type cells) prepared according to Examples 5 to 7 and Comparative Example 4 that underwent the formation process were each charged with a constant current of 0.2 C rate at a temperature of 25° C. within a voltage range of about 4.2 V to about 2.8 V (vs. Li), and then, were each discharged with a constant current of 0.2 C rate (1.2 mA) until the voltage reached a cut-off voltage of about 2.8 V. Afterwards, for lithium batteries prepared according to Examples 5 to 7 and Comparative Example 4, the charge capacity thereof was measured according to increasing discharge rates of 0.5 C, 1.0 C, 2.0 C, and 4.0 C as being calculated relative to 0.2 C charge capacity. Data obtained therefrom was used to evaluate the rate characteristics of the lithium batteries, and the results thereof are shown in FIG. 4. Here, the rate characteristics of the lithium batteries were calculated according to Equation 1, and the calculated results are shown in Table 1.

The term "C-rate" denotes an inverse number of electrical current supplied to charge for 1 hour.

Rate characteristics at each C-rate (%)=[(CC charge capacity at each C-rate/discharge capacity at 0.2 C rate)×100]  Equation 1

TABLE 1

|  | Rate characteristics at 1.0 C rate (%) | Rate characteristics at 2.0 C rate (%) | Rate characteristics at 4.0 C (%) |
| --- | --- | --- | --- |
| Example 5 | 98.5 | 95.2 | 83.9 |
| Example 6 | 98.7 | 96.1 | 88.7 |
| Example 7 | 98.9 | 96.4 | 90.1 |
| Comparative Example 4 | 97.8 | 94.1 | 81.2 |

Referring to FIG. 4 and Table 1, it was confirmed that the lithium batteries (i.e., coin-type cells) prepared according to Examples 5 to 7 exhibited better rate characteristics at 1.0 C, 2.0 C, and 4.0 C charge capacity than those of the lithium battery (i.e., coin-type cell) prepared according to Comparative Example 4.

In addition, it was confirmed that the lithium batteries (i.e., coin-type cells) prepared according to Examples 5 to 7 exhibited better rate characteristics at 4.0 C charge capacity than those of the lithium battery (i.e., coin-type cell) prepared according to Comparative Example 4 by about 3% to 9%. Among the lithium batteries prepared according to Examples 5 to 7, the lithium battery (i.e., coin-type cell) prepared according to Example 7, in which the $Li_4Ti_5O_{12}$ particles were arranged in the greatest amount in the carboniferous pitch (i.e., the coating layer) in a dispersed manner was found to exhibit the greatest rate characteristics at 4.0 C charge capacity.

1.2: Evaluation of Lifespan Characteristics

Figure 5:
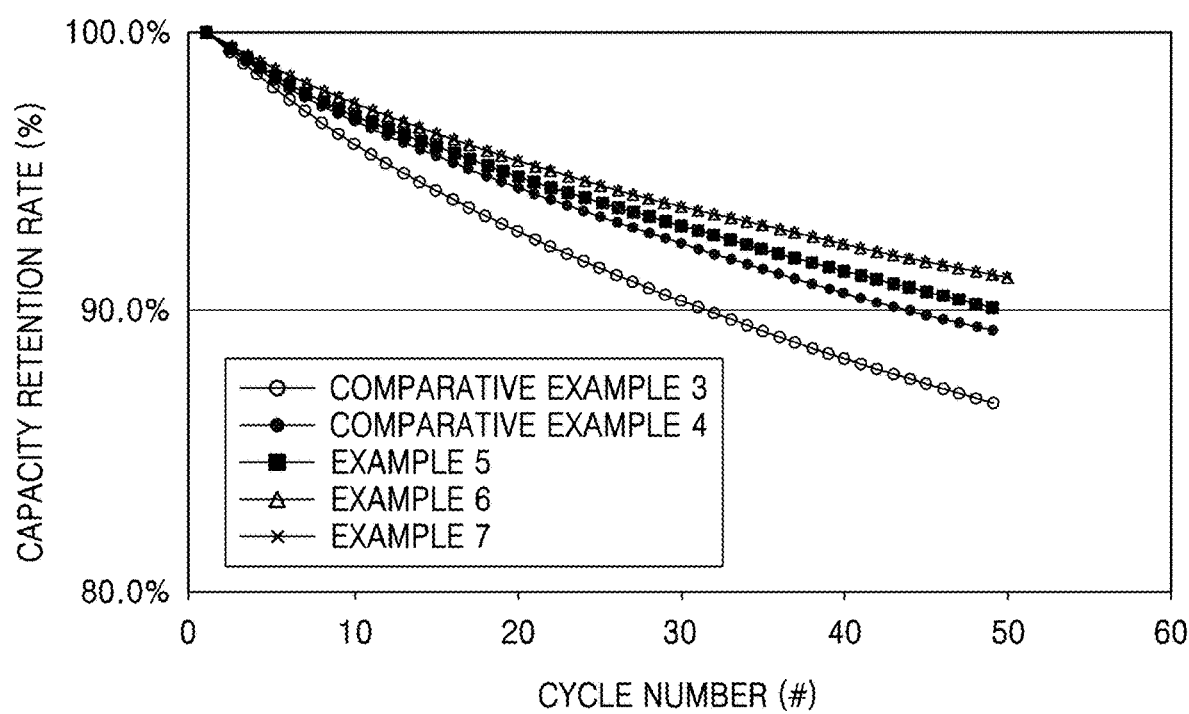
FIG. 5 is a graph of capacity retention (percent, %) versus cycle number illustrating discharge capacity at a temperature of 25° C. of lithium batteries (i.e., coin cells) prepared according to Examples 5 to 7 and Comparative Examples 3 and 4 with respect to the number of cycles.

The lithium batteries (i.e., coin-type cells) prepared according to Examples 5 to 7 and Comparative Examples 3 and 4 that underwent the formation process were each charged with a constant current of 0.2 C rate at a temperature of 25° C. within a voltage range of about 4.2 V to about 2.8 V (vs. Li), and then, were each discharged with a constant current of 0.2 C rate (1.2 mA) until the voltage reached a cut-off voltage of about 2.8 V. Afterwards, the same cycle of charging and discharging was repeated 49 more times (i.e., 50 times in total), and the results are shown in FIG. 5. Here, a capacity retention rate was calculated according to Equation 2, and the results thereof are shown in Table 2.

Capacity retention rate (%)=[(Discharge capacity at 50$^{th}$ cycle/discharge capacity at 1$^{st}$ cycle)×100]    Equation 2

TABLE 2

| | Capacity retention rate (%) at 50$^{th}$ cycle |
|---|---|
| Example 5 | 89.3 |
| Example 6 | 90.18 |
| Example 7 | 91.38 |
| Comparative Example 3 | 86.7 |
| Comparative Example 4 | 89.1 |

Referring to FIG. 5 and Table 2, it was confirmed that the lithium batteries (i.e., coin-type cells) prepared according to Examples 5 to 7 exhibited improved capacity retention rates compared with those of the lithium batteries (i.e., coin-type cells) prepared according to Comparative Examples 3 and 4.

According to the one or more exemplary embodiments as described above, a composite negative active material includes: a core portion including a silicon-based alloy and a shell portion including a coating layer disposed on the core portion, wherein the coating layer includes an amorphous carbon material and a lithium titanium oxide, and a lithium battery including the composite negative active material may have improved rate characteristics and lifespan characteristics It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

In the present disclosure, the terms "Example", "Evaluation Example", "Preparation Example", and "Comparative Example" are used arbitrarily to simply identify a particular example or experimentation and should not be interpreted as admission of prior art. While one or more exemplary embodiments have been described with reference to the figures, it will be understood by those of ordinary skill in the art that various changes in form and details may be made therein without departing from the spirit and scope as defined by the following claims.

What is claimed is:

1. A composite negative electrode active material, comprising:
a core portion comprising a silicon-based alloy;
a continuous carbon coating layer disposed on the core portion; and
lithium titanium oxide particles on an outer surface of the carbon coating layer arranged in a dispersed manner.

2. The composite negative electrode active material of claim 1, wherein the amorphous carbon material comprises soft carbon, hard carbon, coal-based pitch, petroleum-based pitch, mesophase pitch carbide, calcined cokes, and a combination thereof.

3. The composite negative electrode active material of claim 1, wherein the amount of the amorphous carbon material is in a range of about 1 part by weight to about 30 parts by weight based on 100 parts by weight of the core portion.

4. The composite negative electrode active material of claim 1, wherein a thickness of the coating layer is in a range of about 5 nm to about 300 nm.

5. The composite negative electrode active material of claim 1, wherein the lithium titanium oxide is represented by Formula 1:

$$Li_{4-x-y}M_yTi_{5+x-z}M'_zO_{12}$$    Formula 1 wherein, in Formula 1,
0≤x≤1, 0≤y≤1, and 0≤z≤1,
M is at least one element selected from lanthanum (La), terbium (Tb), gadolinium (Gd), cerium (Ce), praseodymium (Pr), neodymium (Nd), samarium (Sm), barium (Ba), strontium (Sr), calcium (Ca), magnesium (Mg), and a combination thereof, and
M' is at least one element selected from vanadium (V), chrome (Cr), niobium (Nb), iron (Fe), nickel (Ni), cobalt (Co), manganese (Mn), tungsten (W), aluminum (Al), gallium (Ga), copper (Cu), molybdenum (Mo), phosphorus (P), or a combination thereof.

6. The composite negative electrode active material of claim 1, wherein an average particle diameter of the lithium titanium oxide is in a range of about 0.1 nm to about 500 nm.

7. The composite negative electrode active material of claim 1, wherein the amount of the lithium titanium oxide is in a range of about 0.1 part by weight to about 10 parts by weight based on 100 parts by weight of the core portion.

8. The composite negative electrode active material of claim 1, wherein the core portion comprises a Si phase and a SiM phase, wherein M is at least one element selected from Ni, Co, arsenic (As), Cr, Cu, Fe, Mg, Mn, and yttrium (Y).

9. The composite negative electrode active material of claim 1, wherein the core portion comprises an alloy represented by Formula 2:

$$Si_aFe_b$$    Formula 2 wherein, in Formula 2,
50≤a≤90, 10≤b≤50, and a+b=100.

10. The composite negative electrode active material of claim 1, wherein the composite electrode active material serves as a negative active material.

11. A lithium battery comprising:
a positive electrode;
a negative electrode comprising the composite negative electrode active material of claim 1; and
an electrolyte disposed between the positive electrode and the negative electrode.

12. A lithium battery of claim 11 comprising the composite negative electrode active material wherein the amount of the amorphous carbon material is in a range of about 1 part by weight to about 30 parts by weight based on 100 parts by weight of the core portion.

13. A lithium battery of claim 11 comprising the composite negative electrode active material wherein a thickness of the coating layer is in a range of about 5 nm to about 300 nm.

14. A lithium battery of claim 11 comprising the composite negative electrode active material wherein the lithium titanium oxide is represented by Formula 1:

$$Li_{4-x-y}M_yTi_{5+x-z}M'_zO_{12}$$    Formula 1 wherein, in Formula 1,
0≤x≤1, 0≤y≤1, and 0≤z≤1,
M is at least one element selected from lanthanum (La), terbium (Tb), gadolinium (Gd), cerium (Ce), praseodymium (Pr), neodymium (Nd), samarium (Sm), barium (Ba), strontium (Sr), calcium (Ca), magnesium (Mg), and a combination thereof, and
M' is at least one element selected from vanadium (V), chrome (Cr), niobium (Nb), iron (Fe), nickel (Ni), cobalt (Co), manganese (Mn), tungsten (W), aluminum (Al), gallium (Ga), copper (Cu), molybdenum (Mo), phosphorus (P), or a combination thereof.

15. A lithium battery of claim 11 comprising the composite negative electrode active material wherein the amount of the lithium titanium oxide is in a range of about 0.1 part by weight to about 10 parts by weight based on 100 parts by weight of the core portion.

* * * * *